(12) United States Patent
VanBlon et al.

(10) Patent No.: US 11,470,392 B1
(45) Date of Patent: Oct. 11, 2022

(54) MEDIA CONTENT PLAYBACK SPEED ADJUSTMENT

(71) Applicant: Lenovo (Singapore) Pte. Ltd., Singapore (SG)

(72) Inventors: Russell Speight VanBlon, Raleigh, NC (US); Mark Delaney, Raleigh, NC (US); Nathan Peterson, Oxford, NC (US); Arnold Weksler, Raleigh, NC (US); John C Mese, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 17/388,432

(22) Filed: Jul. 29, 2021

(51) Int. Cl.
*H04N 21/462* (2011.01)
*H04N 21/439* (2011.01)
*G06F 16/43* (2019.01)
*H04N 21/45* (2011.01)
*H04N 21/44* (2011.01)
*H04N 21/435* (2011.01)

(52) U.S. Cl.
CPC .......... *H04N 21/462* (2013.01); *G06F 16/43* (2019.01); *H04N 21/435* (2013.01); *H04N 21/439* (2013.01); *H04N 21/44008* (2013.01); *H04N 21/4532* (2013.01)

(58) Field of Classification Search
CPC .. H04N 21/462; H04N 21/435; H04N 21/439; H04N 21/44008; H04N 21/4532; G06F 16/43
See application file for complete search history.

(56) References Cited

U.S. PATENT DOCUMENTS

2009/0175590 A1* 7/2009 Ryu .................... H04N 5/00
2020/0243068 A1* 7/2020 Morris ............... G06F 17/2765

* cited by examiner

*Primary Examiner* — Anthony Bantamoi
(74) *Attorney, Agent, or Firm* — Ference & Associates LLC

(57) ABSTRACT

One embodiment provides a method, increasing: receiving, at an information handling device, an indication to adjust a playback speed of media content; determining, using a processor, an optimal playback speed of the media content for a user; and adjusting, responsive to the determining, the playback speed of the media content from an original playback speed to the optimal playback speed. Other aspects are described and claimed.

18 Claims, 3 Drawing Sheets

MEDIA CONTENT PLAYBACK SPEED ADJUSTMENT

BACKGROUND

Individuals utilize information handling devices ("devices"), for example smart phones, tablet devices, laptops and/or personal computers, hybrid devices, and the like, to consume a variety of different types of media content (e.g., audio content, video content, a combination thereof, and the like). Playback of the media content may be manipulated in a number of conventional ways (e.g., an individual may rewind the media, fast forward through the media, pause the media, record the media, skip to a particular portion of the media, etc.). Additionally, in some situations, individuals have the ability to increase or decrease a playback speed of the media content.

BRIEF SUMMARY

In summary, one aspect provides a method, including: receiving, at an information handling device, an indication to adjust a playback speed of media content; determining, using a processor, an optimal playback speed of the media content for a user; and adjusting, responsive to the determining, the playback speed of the media content from an original playback speed to the optimal playback speed.

Another aspect provides an information handling device, including: a processor; a memory device that stores instructions executable by the processor to: receive an indication to adjust a playback speed of media content; determine an optimal playback speed of the media content for a user; and adjust, responsive to the determining, the playback speed of the media content from an original playback speed to the optimal playback speed.

A further aspect provides a product, including: a storage device that stores code, the code being executable by a processor and comprising: code that receives, at an information handling device, an indication to adjust a playback speed of media content; code that determines an optimal playback speed of the media content for a user; and code that adjusts, responsive to the code that determines, the playback speed of the media content from an original playback speed to the optimal playback speed.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
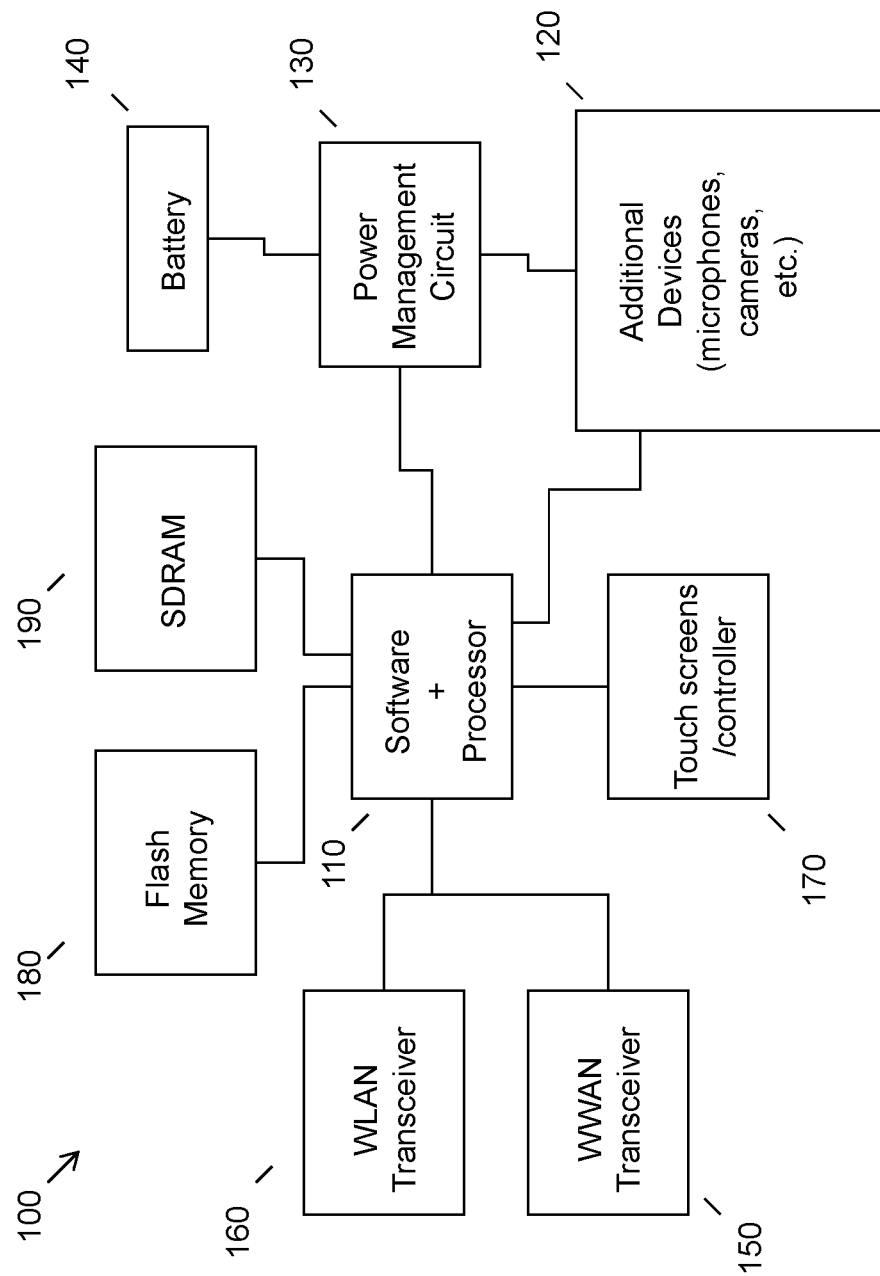
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Certain applications have options that enable users to adjust a playback speed of audio and/or video content (e.g., increase the playback speed, decrease the playback speed, etc.). Such a feature may allow users to consume the media content at a speed that aligns with their particular preferences. For example, users desiring to save time may chose to increase the playback speed of a segment of media content (e.g., a recorded lecture, a conference presentation, etc.) by a predetermined factor (e.g., 2x speed, 3x speed, etc.).

A primary drawback to conventional methods of adjusting the playback speed of media content is the need to make a multitude of manual adjustments, especially when new content is consumed. More particularly, as an example, where an increased playback speed may work for a first piece of media content, the same increased playback speed may not work for a second piece of media content or even at different portions of the first piece of media content (e.g., the content playback may be too fast for a user to effectively understand what is being said or comprehend what is being displayed, etc.). Accordingly, a user must adjust the playback speed for each piece of media content so that they can balance comprehension with time saved. The continual need to identify an appropriate playback speed of media content may be burdensome and/or time-consuming to a user.

Accordingly, an embodiment provides a method for dynamically adjusting a playback speed for media content. In an embodiment, an indication to adjust the playback speed of media content may be received at a device or at an application on the device. An embodiment may then determine an optimal playback speed of the media content for a particular viewer and thereafter dynamically adjust, without receiving additional user input, the playback speed of the media content from an original playback speed to the optimal playback speed. Such a method may allow users to consume media content at a speed optimized for their viewing preferences.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
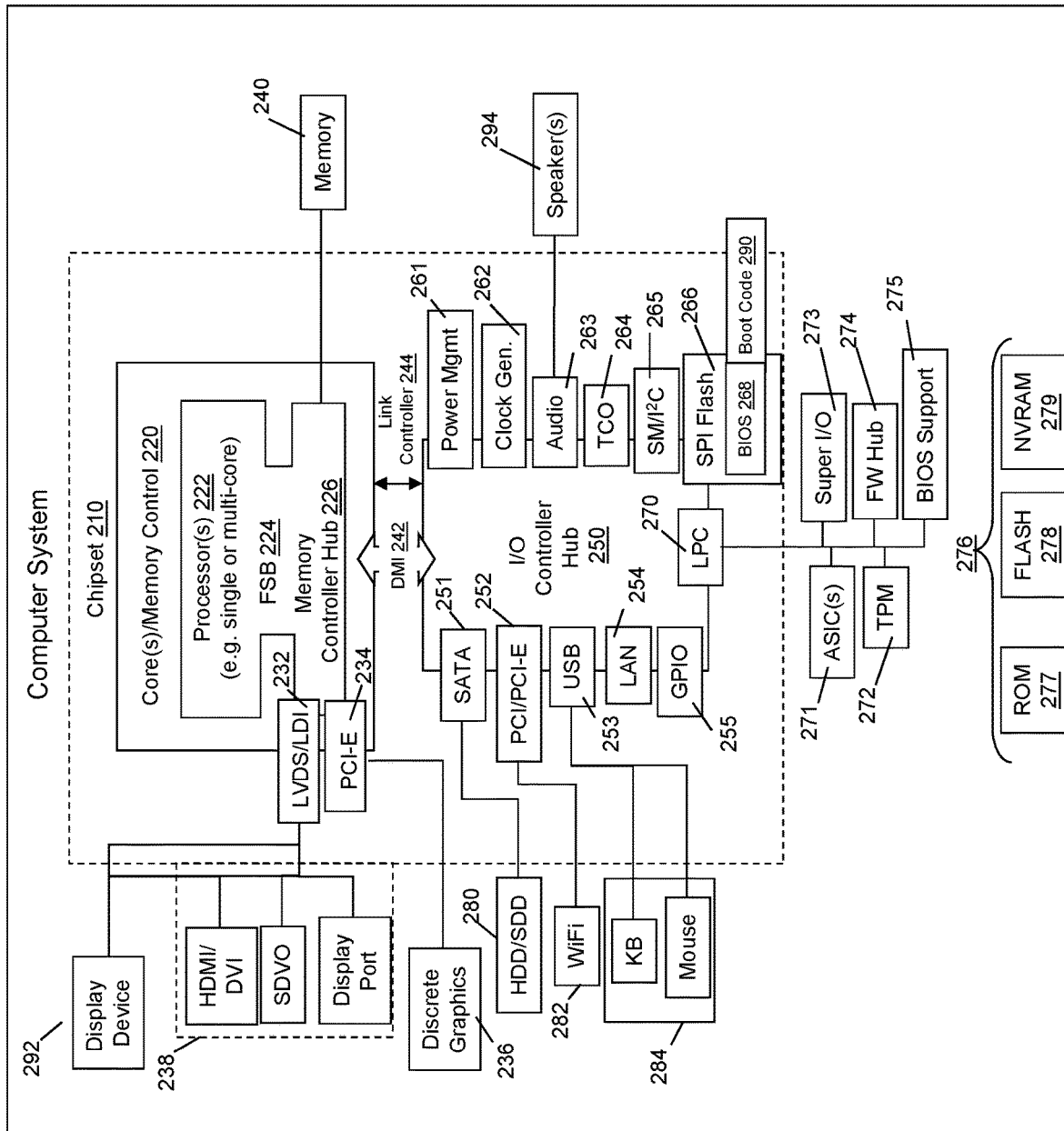
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices that are capable of adjusting a playback speed of media content. For example, the circuitry outlined in FIG. 1 may be implemented in a smart phone or tablet embodiment, whereas the circuitry outlined in FIG. 2 may be implemented in a hybrid computing device.

Figure 3:
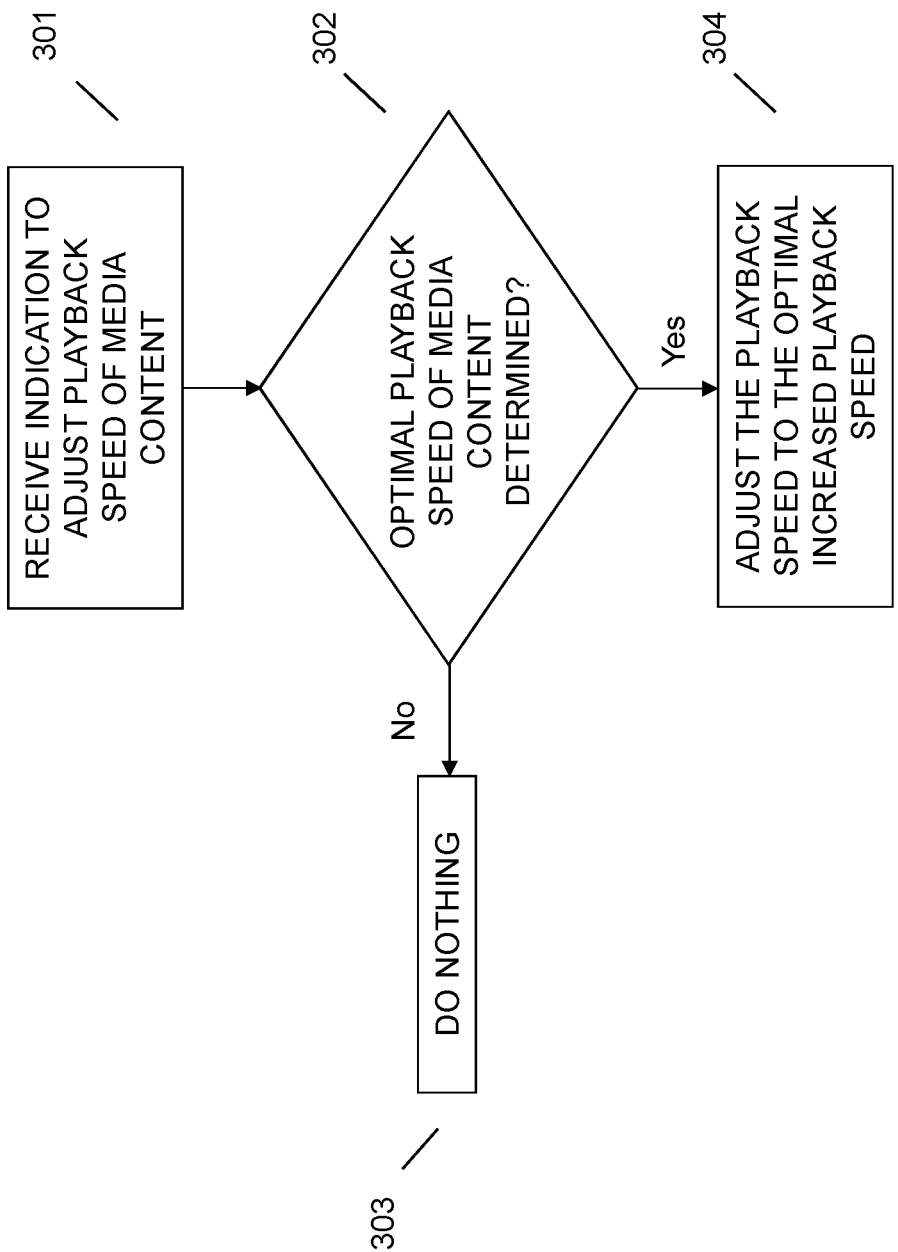
FIG. 3 illustrates an example method of adjusting a playback speed of media content.

Referring now to FIG. 3, an embodiment provides a method of dynamically increasing a playback speed of media content to an optimized playback speed. At 301, an embodiment may receive an indication to adjust a playback speed of media content (e.g., increase playback speed, decrease playback speed, etc.). As described herein, media content may correspond to audio content (e.g., a song, an audio book, a recorded lecture or presentation, another type of audio file, etc.), video content (e.g., a show, a movie, an uploaded video, etc.), or a combination thereof.

In an embodiment, the indication may be derived from a user command to adjust the playback speed of the media content. The user command may be provided to the device, or a relevant application on the device, using one or more conventional command input means (e.g., voice input, touch input, keyboard input, stylus or mouse input, etc.) and may be registered by a corresponding input capture means (e.g., a microphone, touch-capacitive display screen, keyboard, etc.). Alternatively, the indication may be dynamically identified by an embodiment. More particularly, an embodiment may automatically know to adjust the playback speed of media content responsive to identifying the presence of a predetermined event (e.g., by identifying that: a particular application is opened, a particular type of media file is loaded, a particular user is interacting with the device, etc.).

At 302, an embodiment may determine an optimal playback speed of the media content for a user. In the context of this application, the optimal playback speed of the media content may refer to one or more different playback speeds and the selection of which may be based on user preferences (e.g., stored in a user profile, selected by a user at the outset of content viewing, etc.). For example, the optimal playback speed may refer to the maximum playback speed of the media content at which the user can still effectively understand what is being said or displayed. As another example, the optimal playback speed may refer to a most common playback speed as established by other individuals who share similar characteristics with user. Details regarding these determination techniques are further described herein.

In an embodiment, an original speed of media content may be adjusted to a maximum or minimum comprehensible playback speed. The process of determining what that maximum or minimum comprehensible speed is may vary based upon the nature of the media content. More particularly, for audio content an embodiment may first capture/identify audio generated by the media content at the original playback speed and subsequently transcribe it (e.g., using one or more transcription techniques known in the art, etc.). This forms a faithful baseline transcription of what is actually said in the audio. An embodiment may then proceed to adjust the playback speed by a predetermined amount (e.g., by 0.5x, 0.25x 1.5x, 2x, etc.) and subsequently attempt to transcribe what is said in the audio content played at the adjusted speed. If the subsequent transcription shares at least a predetermined level of similarity with the baseline transcription (e.g., that a transcription confidence of the adjusted playback is greater than or equal to 90%, etc.), then an embodiment may continue to correspondingly increase or decrease the playback speed until the transcription confidence is lower than an established threshold amount. The foregoing processes may take place on the back end of the computing system, i.e., away from the user's view.

In an embodiment, the process to determine the maximum or minimum comprehensible playback speed for video content may differ from the process used to determine the maximum or minimum comprehensible playback speed for audio content. More particularly, for video content an embodiment may first extract, utilizing one or more conventional video analysis techniques known in the art, metadata associated with one or more video frames of the media content at the original playback speed. This metadata may serve as a baseline and may provide a faithful indication of an activity or event that is happening in the media content (e.g., "man swinging wooden bat at baseball", "car driving down busy road", etc.). An embodiment may then proceed to increase or decrease the playback speed by a predetermined amount (e.g., by 1.5x, 2x, etc.) and may subsequently attempt to identify, based on extracted metadata, an activity occurring in the faster or slower moving frames. If the identified activity in the speed-adjusted frames shares a predetermined level of similarity (e.g., greater than or equal to 90% similarity, etc.) with the baseline activity, then an embodiment may continue to correspondingly increase or decrease the playback speed until the activity in the frames can no longer be identified or until the identified activity no longer shares a predetermined level of similarity with the baseline activity. The foregoing processes may take place on the back end of the computing system, i.e., away from the user's view.

In an embodiment, the optimal playback speed may refer to a common, crowdsourced playback speed. More particularly, an embodiment may have access to a database that stores data associated with the playback speeds that other individuals have utilized for the type of media content the user is consuming (e.g., the most common playback speed for that article of media content, the fastest playback speed for that article of media content, etc.). In an embodiment, the selection of the common, crowdsourced playback speed may simply adopt the most common playback speed as identified across all other individuals. Alternatively to the foregoing, an embodiment may consider additional factors prior to making this determination. More particularly, an embodiment may identify one or more characteristics associated with a user and/or the media object (e.g., an age category associated with the user, historical playback preferences of the user, a genre of the media content, etc.) and thereafter further tailor the selection of the crowdsourced playback speed based upon these characteristics. For example, an embodiment may identify the most common, crowdsourced playback speed for the media content, or the media content type, based upon the playback speed adjustments across all individuals in the same age category as the user or across all playback speed adjustments for a genre associated with the media content.

In an embodiment, the optimal playback speed may refer to an identification of a user's historical comprehension speed. More particularly, an embodiment may have access to a database (e.g., stored locally on the device or stored remotely on another device or server, etc.) that stores data related to a user's ability to comprehend a particular type of media and/or their playback speed preferences for that type of media. In an embodiment, a user may explicitly identify what their playback speed preferences for different media types are or, alternatively, an embodiment may monitor a user's interactions with media and dynamically deduce those preferences independently (e.g., an embodiment may identify that a user always prefers to watch instructional videos at normal speed but prefers to listen to songs at 1.5x speed, etc.). Responsive to identifying a user's preferences, an embodiment may dynamically establish, as the optimal playback speed, the historical comprehension speed that the user prefers to view the media content at.

In an embodiment, the optimal playback speed may refer to a target playback speed as designated by a user preference. More particularly, a user may identify, as an optimal playback speed, media content that is played back at an X number of words per minute. In an embodiment, each different type of media content may have its own target playback speed (e.g., as originally assigned by manufacturer, as later adjusted by a user, etc.). In such a situation, an embodiment may first identify a nature of the media content and then identify the designated target speed associated with it.

In an embodiment, the determined optimal playback speed for the media content may be stored in a database (e.g., present locally on the device or remotely on another device or server, etc.). This data may be made accessible to the user (e.g., at a later point as part of historical playback data, etc.) and/or to other users (e.g., as crowdsourced data, etc.).

If an embodiment cannot determine, at 302, an optimal playback speed of the media content, an embodiment may, at 303, take no additional action. Conversely, responsive to determining, at 302, an optimal playback speed for the media content, an embodiment may, at 304, adjust the playback speed of the media content from an original playback speed to the optimal playback speed. In an embodiment, the increase or decrease to the playback speed may occur dynamically and without receipt of any additional user input.

In an embodiment, the playback speed may further, after an initial adjustment, be dynamically increased or decreased responsive to the identification of a predetermined event.

More particularly, a user, as part of their preferences, may desire to automatically increase the playback speed for all media of a certain type (e.g., all media of a particular genre, all media presented by a particular presenter, etc.). Responsive to identifying that a different type of media content is being played back, an embodiment may dynamically decrease the playback speed of the media content. For example, an embodiment may dynamically decrease the playback speed responsive to identifying that a new presenter is now speaking, where the new presenter speaks much faster than the previous presenter for which the playback speed was increased.

The various embodiments described herein thus represent a technical improvement to conventional methods for adjusting the playback speed of media content. Using the techniques described herein, an embodiment may receive an indication to adjust a playback speed of media content (e.g., audio content, video content, a combination thereof, etc.). An embodiment may then determine an optimal playback speed of the media content for the viewer (e.g., the fastest comprehensible playback speed of the media content, a most common playback speed of the media content across crowd-source data, etc.). Thereafter, an embodiment may automatically adjust the playback speed of the media content from the original playback speed to the optimized playback speed. Such an embodiment may ensure that a user is consuming and/or interacting with the media content at the pace they are most comfortable with.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication to adjust a playback speed of media content;
   determining, using a processor, an optimal playback speed of the media content for a user, wherein the determining comprises identifying one or more characteristics associated with the user, identifying a maximum comprehensible playback speed for the user based upon the one or more characteristics, and dynamically establishing the optimal playback speed for the user based upon the maximum comprehensible playback speed; and
   adjusting, responsive to the determining, the playback speed of the media content from an original playback speed to the optimal playback speed, wherein the adjusting the playback speed comprises adjusting the playback speed based upon the dynamically established optimal playback speed and without additional user input.

2. The method of claim 1, wherein the media content corresponds to at least one of: audio content and video content.

3. The method of claim 1, wherein the identifying the maximum comprehensible playback speed of the media content comprises:

capturing, at an input device associated with the information handling device, audio generated from the media content at the original playback speed;
transcribing the captured audio at the original playback speed;
iteratively increasing the playback speed of the media content; and
identifying, as the maximum comprehensible playback speed, a fastest playback speed at which a transcription confidence for transcription of the media content remains at or above a predetermined threshold.

4. The method of claim 1, wherein the identifying the maximum comprehensible playback speed of the media content comprises:
extracting, via analysis of a plurality of video frames of the media content at the original playback speed, metadata;
determining, from the metadata, an activity occurring in the media content;
iteratively increasing the playback speed of the media content; and
identifying, as the maximum comprehensible playback speed, a fastest playback speed at which extracted metadata from the plurality of the video frames provides a clear indication of the activity.

5. The method of claim 1, wherein the determining the optimal playback speed comprises:
identifying at least one characteristic associated with the user or the media content;
accessing crowdsourced data associated with the at least one characteristic, wherein the crowdsourced data identifies a crowdsourced playback speed for the media content based on the at least one characteristic; and
establishing, as the increased optimal playback speed, the crowdsourced playback speed;
wherein the at least one characteristic is selected from the group consisting of: an age category of the user, a historical playback preference of the user, and a genre of the media content.

6. The method of claim 1, wherein the determining the optimal playback speed comprises:
accessing a database comprising an indication of a historical comprehension speed of user for the media content; and
establishing, as the optimal playback speed, the historical comprehension speed.

7. The method of claim 1, wherein the determining the optimal playback speed comprises:
identifying a target for a number of words to be recited in the media content over a predetermined period of time; and
establishing, as the optimal playback speed, an increased playback speed at which the target is reached.

8. The method of claim 1, further comprising storing an indication of the optimal playback speed for the media content in a database, wherein the database is accessible by other individuals also viewing the media content.

9. The method of claim 1, further comprising automatically decreasing the playback speed from the optimal playback speed responsive to identification of a predetermined event.

10. An information handling device, comprising:
a processor;
a memory device that stores instructions executable by the processor to:
receive an indication to adjust a playback speed of media content;
determine an optimal playback speed of the media content for a user, wherein the determining comprises identifying one or more characteristics associated with the user, identifying a maximum comprehensible playback speed for the user based upon the one or more characteristics, and dynamically establishing the optimal playback speed for the user based upon the maximum comprehensible playback speed; and
adjust, responsive to the determining, the playback speed of the media content from an original playback speed to the optimal playback speed, wherein to adjust the playback speed comprises adjusting the playback speed based upon the dynamically established optimal playback speed and without additional user input.

11. The information handling device of claim 10, wherein the media content corresponds to at least one of: audio content and video content.

12. The information handling device of claim 10, wherein the instructions executable by the processor to identify the maximum comprehensible playback speed of the media content comprise instructions executable by the processor to:
capture, at an input device associated with the information handling device, audio generated from the media content at the original playback speed;
transcribe the captured audio at the original playback speed;
iteratively increase the playback speed of the media content; and
identify, as the maximum comprehensible playback speed, a fastest playback speed at which a transcription confidence for transcription of the media content remains at or above a predetermined threshold.

13. The information handling device of claim 10, wherein the instructions executable by the processor to identify the maximum comprehensible playback speed of the media content comprise instructions executable by the processor to:
extract, via analysis of a plurality of video frames of the media content at the original playback speed, metadata;
determine, from the metadata, an activity occurring in the media content;
iteratively increase the playback speed of the media content; and
identify, as the maximum comprehensible playback speed, a fastest playback speed at which extracted metadata from the plurality of the video frames provides a clear indication of the activity.

14. The information handling device of claim 10, wherein the instructions executable by the processor to determine the optimal playback speed comprise instructions executable by the processor to:
identify at least one characteristic associated with the user or the media content;
access crowdsourced data associated with the at least one characteristic, wherein the crowdsourced data identifies a crowdsourced playback speed for the media content based on the at least one characteristic; and
establish, as the optimal playback speed, the crowdsourced playback speed;
wherein the at least one characteristic is selected from the group consisting of: an age category of the user, a historical playback preference of the user, and a genre of the media content.

15. The information handling device of claim 10, wherein the instructions executable by the processor to determine the optimal playback speed comprise instructions executable by the processor to:

access a database comprising an indication of a historical comprehension speed of user for the media content; and establish, as the increased optimal playback speed, the historical comprehension speed.

16. The information handling device of claim 10, wherein the instructions executable by the processor to determine the optimal playback speed comprise instructions executable by the processor to:

identify a target for a number of words to be recited in the media content over a predetermined period of time; and establish, as the optimal increased playback speed, an increased playback speed at which the target is reached.

17. The information handling device of claim 10, wherein the instructions are further executable by the processor to automatically decrease the playback speed from the optimal playback speed responsive to identification of a predetermined event.

18. A product, comprising:

a storage device that stores code, the code being executable by a processor and comprising:

code that receives, at an information handling device, an indication to adjust a playback speed of media content;

code that determines an optimal playback speed of the media content for a user, wherein the determining comprises identifying one or more characteristics associated with the user, identifying a maximum comprehensible playback speed for the user based upon the one or more characteristics, and dynamically establishing the optimal playback speed for the user based upon the maximum comprehensible playback speed; and code that adjusts, responsive to the code that determines, the playback speed of the media content from an original playback speed to the optimal increased playback speed, wherein the code that adjusts the playback speed comprises adjusting the playback speed based upon the dynamically established optimal playback speed and without additional user input.

* * * * *